3,039,919
PHENYL ACYCLIC SULFONES AS FUNGICIDAL
COMPOSITIONS
Joseph E. Moore, 3100 Pinole Valley Road, Pinole, Calif.
No Drawing. Filed May 26, 1960, Ser. No. 31,808
6 Claims. (Cl. 167—30)

This invention relates to a novel class of sulfones and a method of their preparation. In particular, the invention relates to the production of a new class of phenyl acrylic sulfones which are of particular value as toxicants and useful in the formulation of fungicidal compositions.

Certain specific sulfones have been synthesized, some of them possessing fungicidal properties. An example is found in U.S. Patent No. 2,484,489, disclosing a fungicide containing 3,4-dichlorophenyl tribromomethyl sulfone. The disclosure of sulfones as fungicides, however, is generally restricted to substituted and unsubstituted phenyl methyl, phenyl ethyl, and phenyl vinyl sulfones. A monochlorobutyl p-chlorophenyl sulfone, a member of the class of phenyl monohalobutyl sulfones, has been disclosed as a plasticizer, a flame-retardant agent, a lube oil additive, and an intermediate, but not as a fungicide (U.S. Patent 2,573,580). Biological tests on this class of compounds, however, have revealed fungicidal activity of a low order. Consequently this reference leads away from further synthesis of phenyl halobutyl sulfones to obtain fungicidal compositions.

Contrary to the expectation based on knowledge derived from the prior art, it has now been discovered that a new class of substituted and unsubstituted phenyl acyclic sulfones provide excellent fungicides. These new compounds are characterized by an acyclic radical of four carbon atoms, which is substituted by at least three halogens or, in other words, a polyhalobutyl or polyhalobutenyl radical containing at least three halogens. The phenyl radical is represented by the formula:

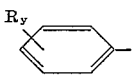

wherein R represents the same or different substituents selected from the class consisting of alkyl and halogen, and $y$ is selected from the group consisting of O and integers from 1 to 5. Preferred compounds having superior fungicidal activity have been found to be those wherein R represents the same or different substituents selected from the class consisting of lower alkyl, chlorine, and bromine, $y$ is selected from the group consisting of O and integers from 1 to 3, and the acyclic radical is selected from the group consisting of trihalobutyl, trihalobutenyl, tetrahalobutyl, and tetrahalobutenyl radicals.

Although it is possible to isolate sulfones having a particular number of halogens in a certain arrangement on the butyl group as well as a specific number and kind of substituents uniquely arranged on the phenyl group, mixtures of compounds within the disclosed class are also excellent fungicides, thus eliminating the necessity for a high degree of purification of species. The difficulty of isolation of individual species from isomers thereof increases with the number of halogens on the acyclic radical. It has been surprisingly found, however, that to obtain a practical amount of fungicidal activity, the acyclic radical must contain at least three halogens. These may be the same or different halogens. From the art available on sulfones, it was impossible to predict that this particular distinct and novel class of phenyl acyclic sulfones would show such excellent fungicidal activity.

Specific classes of preferred compounds of the invention include those where the acyclic radical is trihalobutyl, trihalobutenyl, tetrahalobutyl, and tetrahalobutenyl, and the phenyl radical is pentahalophenyl, trihalophenyl, alkylhalophenyl, polyalkylphenyl, alkyphenyl, halophenyl, unsubstituted phenyl, etc.

These unique compounds are produced by using specific variations on a generalized method of preparation. Fundamentally the preparation of a phenyl acyclic sulfone involves the addition of the corresponding phenyl sulfenyl halide across an unsaturated linkage in a polyhalobutene or polyhalobutyne to obtain the corresponding phenyl acyclic sulfide. The phenyl acyclic sulfide thus obtained is then oxidized by a suitable oxidizing agent to the desired sulfone.

The particular phenyl sulfenyl halide and polyhalobutene or polyhalobutyne selected will depend upon the desired sulfone to be prepared. A polyhalobutene is selected where a saturated acyclic radical is desired and a polyhalobutyne where an unsaturated acyclic radical is wanted. The halogen and the number, kind, and position of the subtituents on the phenyl group of the phenyl sulfenyl halide as well as the number, kind, and position of the halogens on the acyclic radical may be selected to obtain the desired sulfone.

The preparation begins by first preparing the phenyl acyclic sulfide intermediate by reacting approximately equimolar quantities of a phenyl sulfenyl halide with a polyhalobutene or polyhalobutyne at temperatures in the range from about —30° to about 200° C., the temperature of reaction depending on the particular reactants and products involved. The temperature of reaction is not critical, and a temperature should be selected which is sufficiently high to cause the reaction to take place at a reasonable rate, yet below the temperature at which either products or reactants tend to decompose. The reaction may be conducted in the presence of an inert solvent such as hexane, acetic acid, methylene chloride, carbon tetrachloride, etc., if desired. However, where both the reactants are liquids, a solvent may be unnecessary. Generally, the reaction is allowed to continue and the reaction temperature maintained until the sulfenyl halide disappears. The presence of sulfenyl halide may be detected by the characteristic sulfenyl halide color or alternatively by means of starch-iodide paper.

If the particular phenyl sulfenyl halide desired as a reactant is not commercially available, it may be synthesized. One method of synthesis comprises reacting the corresponding phenyl disulfide with the desired halogen. This also may be carried out in the presence of an inert solvent such as hexane, methylene chloride, carbon tetrachloride, etc., if desired.

The phenyl acyclic sulfides thus prepared are then oxidized to the corresponding sulfone with a suitable oxidizing agent at a temperature ranging from about 0° to about 200° C., depending upon the particular reactants and products. The temperature should be maintained sufficiently high to cause the reaction to proceed at a reasonable rate, but should not be high enough to cause any appreciable decomposition of reactants or products. A variety of oxidizing agents such as hydrogen peroxide, potassium permanganate, chromic acid, perbenzoic acid, oxygen, or air may be used. If desired, inert solvents such as acetic acid, acetone, or an acetic acid-acetic anhydride mixture may be employed to contain the reaction components and products.

Certain phenyl acyclic sulfones may be prepared from a different phenyl acyclic sulfone intermediate which is reacted in such a manner so as to change the position, kind, and/or number of halogens on the acyclic radical. In this manner it is often possible to prepare indirectly certain phenyl acyclic sulfones such as phenyl iodobutyl sulfones, phenyl polyhalobutyl and polyhalobutenyl sulfones having mixed halogens on the butyl or butenyl group, and phenyl acyclic sulfones having more than three halogens on the acyclic radical which are more difficult to prepare directly. Accordingly, the choice of a specific method of preparation will depend upon the composition of the product desired, the reactants available, and the choice of the practitioner in choosing the most desirable sequence of steps to form that particular composition.

As an illustration of the variations in specific compositions of the class of compounds of the invention and adaptability of the aforementioned method of preparation, the following examples are presented. It is to be understood that the compounds prepared in these examples are merely representative of the various compounds falling within the scope of the phenyl acyclic sulfones and are not to be construed as limitations on the scope of the invention.

EXAMPLE 1

29.0 g. trans-1,4-dichlorobutene-2 was stirred while 35.8 g. 4-chlorophenylsulfenylchloride was added dropwise, keeping the temperature below 55° C. by means of an ice bath. The mixture was finally heated to 40° C. and this temperature maintained for two hours, at which time the mixture was cooled and allowed to solidify. Recrystallization from methanol yielded 43.0 g. of a white solid consisting of 2-(4-chlorophenylthio)-1,3,4-trichlorobutane. A mixture of 6 g. of the above sulfide, 6 g. 30 percent aqueous hydrogen peroxide and 120 ml. glacial acetic acid was heated at reflux temperature for about 1½ hours. The solution was then cooled and poured into ice water. A solid separated which was filtered and air dried. 6.0 g. of a white solid was obtained, melting at 83–85° C. and analyzed to be 2-(4-chlorophenylsulfonyl)-1,3,4-trichlorobutane. This compound is one of two possible d,l pairs, the other being shown in Example 2.

|  | Found | Theoretical |
|---|---|---|
| Percent Cl | 41.5 | 42.2 |
| Percent S | 9.3 | 9.5 |

EXAMPLE 2

A mixture of 11.3 g. cis-1,4-dichlorobutene-2 and 50 ml. carbon tetrachloride was stirred while 16.2 g. 4-chlorophenylsulfenylchloride was added dropwise. The solution was heated at reflux temperature for one hour. The solvent was removed by distillation, leaving as a residue 2-(4-chlorophenylthio)-1,3,4-trichlorobutane.

A mixture of 10.0 g. of the above sulfide, 9.7 g. 30 percent aqueous hydrogen peroxide, and 100 ml. glacial acetic acid was heated at reflux temperature for 1½ hours. The solution was then cooled and poured into ice water. A solid separated which was filtered and air dried. 9.2 g. of a white solid melting at 100–102° C. was obtained and analyzed to be 2-(4-chlorophenylsulfonyl)-1,3,4-trichlorobutane. This compound is the other of two possible d,l pairs, the first being shown in Example 1.

|  | Found | Theoretical |
|---|---|---|
| Percent Cl | 41.3 | 42.2 |

EXAMPLE 3

A mixture of 28.7 g. bis-(4-chlorophenyl) disulfide, 16 g. bromine, and 150 ml. carbon tetrachloride was refluxed for five hours. The solution was cooled and 25.0 g. 1,4-dichlorobutene-2 was added dropwise, keeping the temperature below 35° C. by means of an ice bath. The solution was then stirred for 30 minutes and the solvent removed by distillation, leaving as a residue 2-bromo-3-(4-chlorophenylthio)-1,4-dichlorobutane, which slowly solidified on standing.

55.0 g. of the above sulfide was stirred with 500 ml. glacial acetic acid at 110° C. while 47.0 g. 30 percent aqueous hydrogen peroxide was added dropwise, keeping the temperature below 115° C. After stirring at a temperature of 110° C. for an additional hour, the solution was then cooled and poured into ice water. A solid separated which was filtered and air dried. Recrystallization of that solid from methanol yielded 36.0 g. of a white solid melting at 83–84° C. and analyzed to be 2-bromo-3-(4-chlorophenylsulfonyl)-1,4-dichlorobutane.

|  | Found | Theoretical |
|---|---|---|
| Percent Br | 19.9 | 20.9 |

EXAMPLE 4

20.0 g. 1,4-dibromobutene-2 was stirred while 16.7 g. 4-chlorophenylsulfenylchloride was added dropwise as the temperature rose a few degrees. A solid slowly crystallized on standing. This solid was recrystallized from methanol to give 14.0 g. of a white solid consisting of 2-chloro-3-(4-chlorophenylthio)-1,4-dibromobutane.

A mixture of 10.0 g. of the above sulfide, 7.5 g. 30 percent aqueous hydrogen peroxide, and 100 ml. glacial acetic acid was heated at reflux temperature for about 2½ hours. The solution was then cooled and poured into ice water. A solid separated which was filtered and air dried. Recrystallization of that solid from methanol yielded 5.4 g. of a white solid, melting at 62–64° C. and analyzed to be 2-chloro-3-(4-chlorophenylsulfonyl)-1,4-dibromobutane.

|  | Found | Theoretical |
|---|---|---|
| Percent Br | 36.5 | 37.7 |

EXAMPLE 5

437 g. 4-chlorophenylsulfenylchloride was stirred while 300 g. 1,4-dichloro-2-butyne was added dropwise, keeping the temperature at about 50–55° C. by means of an ice bath. This temperature was maintained for about one hour after the addition was completed, at which time the mixture was cooled and allowed to solidify. Recrystallization from methanol yielded 561 g. of a white solid consisting of 2-(4-chlorophenylthio)-1,3,4-trichlorobutene-2.

A mixture of 100 g. of the above sulfide, 100 g. 30 percent aqueous hydrogen peroxide, and 500 ml. glacial acetic acid was vigorously stirred and slowly heated to about 70–80° C., at which time external heating was ceased. After a few minutes, the heat of reaction lessened and external heat was again applied to maintain the temperature between about 90–100° C. for about two hours. The solution was then cooled and poured into ice water. A solid separated which was filtered, water-washed, and air dried. 102 g. of a white solid was obtained, melting at 103–107° C. and analyzed to be 2-(4-chlorophenylsulfonyl)-1,3,4-trichlorobutene-2.

|  | Found | Theoretical |
|---|---|---|
| Percent C | 36.1 | 35.9 |
| Percent H | 2.5 | 2.4 |
| Percent Cl | 42.8 | 42.4 |
| Percent S | 9.7 | 9.6 |

100 g. of the above sulfone was added at room temperature to a continuously stirred mixture of 100 g. sodium iodide and 300 ml. acetone. The temperature of the mixture rose about 5° C. and the color of iodine and the appearance of salt were immediately evident. The mixture was refluxed two hours, cooled, and filtered. The acetone was removed by distillation, and the residue was dissolved in 200 ml. of carbon tetrachloride, washed with 10% aqueous sodium thiosulfate, water-washed, and dried over anhydrous magnesium sulfate. The resulting solution was treated with 47.9 g. of bromine, keeping the temperature below 60° C. by means of an ice bath. The solution was then stirred and refluxed for about one hour, at which time the solvent was removed by distillation, leaving a solid residue. This residue was recrystallized from methanol, yielding 37.0 g. of a white solid, melting at 117–119° C. and analyzed to be 2-chloro-3-(4-chlorophenylsulfonyl)-1,4-dibromobutene-2.

|  | Found | Theoretical |
|---|---|---|
| Percent Br | 34.1 | 37.8 |
| Percent Cl | 16.3 | 16.8 |

EXAMPLE 6

A mixture of 20 g. bis-(4-chlorophenyl) disulfide, 11.1 g. bromine, and 150 ml. carbon tetrachloride was refluxed for five hours. The solution was cooled and stirred while 17.1 g. 1,4-dichlorobutyne was added dropwise. The resulting solution was refluxed for two hours and the solvent removed by distillation. The residue solidified on cooling and was recrystallized from methanol to yield 12.5 g. of a solid consisting of 2-bromo-3-(4-chlorophenylthio)-1,4-dichlorobutene-2.

A mixture of 10.0 g. of the above sulfide, 10 g. 30 percent aqueous hydrogen peroxide, and 100 ml. glacial acetic acid was vigorously stirred and slowly heated to about 90–100° C. and maintained at this temperature for about two hours. The solution was then cooled and poured into ice water. A solid separated which was filtered, water-washed, and air dried. Recrystallization of that solid from methanol yielded 4.5 g. of a white solid melting at 76–80° C., and analyzed to be 2-bromo-3-(4-chlorophenylsulfonyl)-1,4-dichlorobutene-2.

|  | Found | Theoretical |
|---|---|---|
| Percent Br | 19.8 | 21.1 |
| Percent S | 9.9 | 8.4 |

EXAMPLE 7

26.0 g. 1,4-dichlorobutyne was stirred while a solution of carbon tetrachloride containing 30.0 g. phenylsulfenylchloride was added dropwise, keeping the temperature below 30° C. by means of an ice bath. The solvent was removed by distillation and 30.0 g. of the residue was fractionated. A fraction was obtained consisting of 9.0 g. 2-phenylthio-1,3,4-trichloro-butene-2.

A mixture of 5.0 g. of the above sulfide, 7.0 g. 30 percent aqueous hydrogen peroxide, and 75 ml. glacial acetic acid was heated at reflux temperature for 1½ hours. The solution was then cooled and poured into ice water. A solid separated which was filtered and air dried. Recrystallization of that solid from methanol yielded 2.2 g. of a white solid melting at 73–75° C. and analyzed to be 2-phenylsulfonyl-1,3,4-trichlorobutene-2.

|  | Found | Theoretical |
|---|---|---|
| Percent Cl | 35.6 | 35.6 |

EXAMPLE 8

21.7 g. 1,4-dichlorobutyne was stirred while 47.0 g. 4-methylphenylsulfenylchloride was added dropwise, keeping the temperature below 30° C. by means of an ice bath. The mixture was dissolved in boiling hexanes and cooled. A solid separated which was recrystallized from methanol to give 12.0 g. 2-(4-methylphenylthio)-1,3,4-trichlorobutene-2).

A mixture of 10.0 g. of the above sulfide, 10 g. 30 percent aqueous hydrogen peroxide, and 100 ml. glacial acetic acid was heated at reflux temperature for about 1½ hours. The solution was then cooled and poured into ice water. A solid separated which was filtered and air dried. Recrystallization from methanol yielded 10.0 g. of a white solid melting at 115–117° C. and analyzed to be 2-(4-methylphenylsulfonyl)-1,3,4-trichlorobutene-2.

|  | Found | Theoretical |
|---|---|---|
| Percent Cl | 33.2 | 34.0 |

Although the unusual properties of this novel class of phenyl acyclic sulfones are adaptable to a variety of practical applications such as plasticizers, intermediates, and the like, their fungitoxic properties have been determined and the compounds have been found effective for the production of fungicidal compositions. As an illustration of the fungitoxic properties of these compounds, the following test results are presented.

Some of the compounds synthesized in the above examples and also examples of a phenyl monohalobutenyl, a phenyl dihalobutyl, and a phenyl dihalobutenyl sulfone were tested for fungicidal activity by means of "The Standard Spore Slide-Germination Method for Determining Fungicidal Activity," described in the American Phytopathological Society Journal, vol. 33, pages 627–632, 1943. This test is designed to measure the fungitoxic activity of fungicidal chemicals. This activity is expressed in terms of their inhibition of germination of fungus spores.

Each compound to be tested was dissolved in acetone in dilutions varying from 10.0 to 0.5 p.p.m. These solutions were then pipetted into the wells of depression slides and allowed to dry. The wells were filled with a spore suspension of the test organism, *Monolinia fructicola* or *Alternaria solani*, and incubated in a moist chamber overnight. One hundred spores were used in each dosage.

The number of spores not germinated were counted and recorded to show the percentage germination inhibition.

The results of the tests are presented in Table I.

Table I

| Compound | Percent inhibition | | | | | | | |
|---|---|---|---|---|---|---|---|---|
| | *Monilinia fructicola*, p.p.m. | | | | *Alternaria solani*, p.p.m. | | | |
| | 10 | 3 | 1 | 0.5 | 10 | 3 | 1 | 0.5 |
| 2-(4-chlorophenylsulfonyl)-1,2,4-trichlorobutane [1] | 100 | 100 | 98 | 28 | 100 | 100 | 96 | 61 |
| 2-(4-chlorophenylsulfonyl)-1,3,4-trichlorobutane [2] | 100 | 100 | 100 | 6 | 100 | 100 | 39 | |
| 2-chloro-3-(4-chlorophenylsulfonyl)-1,4-dibromobutane | 100 | 100 | 100 | | 100 | 100 | 38 | |
| 2-(4-chlorophenylsulfonyl)-1,3,4-trichlorobutene-2 | 100 | 100 | 100 | 34 | 100 | 100 | 99 | 86 |
| 2-chloro-3-(4-chlorophenylsulfonyl)-1,4-dibromobutene-2 | 100 | 100 | 100 | 100 | 100 | 82 | 3 | |
| 2-bromo-3-(4-chlorophenylsulfonyl)-1,4-dichlorobutene-2 | 100 | 100 | 100 | 96 | 100 | 100 | 57 | |
| 2-chloro-4-chlorophenylsulfonyl)-butene-2 | 0 | | | | 0 | | | |
| 2-chloro-3-(4-chlorophenylsulfonyl)-butene-2 | 0 | | | | 0 | | | |
| 2-(4-chlorophenylsulfonyl)-1,4-dichlorobutene-2 | 100 | 16 | 0 | | 100 | 1 | | |
| 1-(4-chlorophenylsulfonyl)-2,3-dibromoisobutane | 84 | 0 | 0 | | 1 | 0 | 0 | |

[1] One of d,l pair as shown in Example 1.
[2] One of d,l pair as shown in Example 2.

It is clearly seen from the above table that the fungicidal activity of phenyl acyclic sulfones having at least three halogens on the acyclic radical is immensely greater than that of phenyl acyclic sulfones having only one or two halogens on their acyclic radical.

Other compounds synthesized in the foregoing examples along with examples of a monohalobutyl and a dihalobutyl phenyl sulfone were tested directly on live celery plants, which were subsequently inoculated with a fungus causing celery late blight. In this test four replicate young Utah celery plants growing in a standard University of California soil mix, each having 5 stalks 4–5″ in length were sprayed at 15 p.s.i. with the fungitoxic chemical to be tested in aqueous suspensions varying from 1000 to 40 p.p.m. These suspensions were made uniform by means of an inert wetting agent and suitable filler. The plants were dried at ambient greenhouse temperatures and then inoculated with a spray of an aqueous suspension of approximately 25,000 spores per ml. of *Septoria apii f. graveolentus*. The plants were immediately incubated in a mist room for 24 hours at 65–70° F. and 100 percent relative humidity after which they were removed to a room with ambient temperatures in the range of about 72–80° F. and relative humidity of about 70–80 percent for 14 days. At the end of the incubation period disease readings were made by counting the number of disease pustules on the three oldest stalks. These counts were compared with a similarly treated but unsprayed control series to determine the percentage of fungus control effected by the fungitoxic chemicals. The results are shown in Table II.

Table II

| Compound | Percent Control | | | |
|---|---|---|---|---|
| | P.p.m., 1,000 | P.p.m., 250 | P.p.m., 100 | P.p.m., 40 |
| 2-bromo-3-(4-chlorophenylsulfonyl)-1,4-dichlorobutane | 100 | 100 | 97 | 97 |
| 2 - phenylsulfonyl - 1,3,4 - trichlorobutene-2 | 100 | 99 | 91 | 18 |
| 2 - (4 - methylphenylsulfonyl) - 1-3-4 - trichlorobutene-2 | 100 | 100 | 89 | 33 |
| 2 - chloro - 3-(4-chlorophenylsulfonyl) butane | 0 | | | |
| 2 - (4 - chlorophenylsulfonyl) - 2,3 - dibromobutane | 31 | | 8 | |

Again, the marked superiority in fungitoxicity of the phenyl acyclic sulfones having at least 3 halogens in the acyclic radical over those having less than 3 halogens is clearly seen from the above table.

Aside from the specific formulation and application of the class of compounds of the invention as represented by the foregoing tests, these compounds may be dispersed in or upon other inert liquid and solid carriers such as inert clay, xylenes, etc. The solid carriers may be in the form of a dust, or used in conjunction with a suitable wetting agent to form a wettable power. The fungitoxic compounds of the invention may also be formulated with other solvents, dispersing agents, or emulsifying agents. Further, these compounds may not only be applied alone or in mixtures with other compounds of the disclosed class, but may also be used in combination with other active toxicants in the formulation of fungicidal compositions.

The compounds may be applied to any environmental area which is a host to fungus or susceptible to fungus attack. For example, the fungicidal compositions may be sprayed or otherwise applied directly to a plant or other host, may be applied to the plant seed, sprayed upon the plant environment, or used in other similar ways so as to effect the control of fungus-caused diseases.

Obviously, many modifications and variations of the invention, as hereinabove set forth, may be made without departing from the spirit and scope thereof, and therefore only such limitation should be imposed as are indicated in the appended claims.

I claim:

1. A phenyl acyclic sulfone wherein the acylic radical is selected from the group consisting of trihalobutyl, trihalobutenyl, tetrahalobutyl, and tetrahalobutenyl radicals and wherein the phenyl radical is represented by the formula:

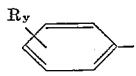

wherein R is selected from the class consisting of alkyl and halogen, and $y$ is selected from the group consisting of 0 and integers from 1 to 5.

2. A fungicidal composition comprising a biologically inert carrier and a fungitoxic amount of a phenyl acyclic sulfone wherein the acyclic radical consists of four carbon atoms and is substituted by at least three halogens, and wherein the phenyl radical is represented by the formula:

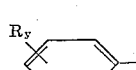

wherein R is selected from the class consisting of alkyl and halogen, and $y$ is selected from the group consisting of 0 and integers from 1 to 5.

3. A method of preventing fungus damage to a host subject to attack by said fungus comprising treating said host with a fungitoxic amount of a phenyl acyclic sulfone wherein the acyclic radical consists of four carbon atoms and is substituted by at least three halogens, and wherein the phenyl radical is represented by the formula:

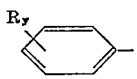

wherein R is selected from the class consisting of alkyl and halogen, and y is selected from the group consisting of O and integers from 1 to 5.

4. A method of controlling plant diseases which comprises treating a plant with a fungitoxic amount of a phenyl acyclic sulfone wherein the acyclic radical consists of four carbon atoms and is substituted by at least three halogens, and wherein the phenyl radical is represented by the formula:

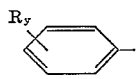

wherein R is selected from the class consisting of alkyl and halogen, and y is selected from the group consisting of O and integers from 1 to 5.

5. A method of killing fungus which comprises contacting said fungus with a fungitoxic amount of a phenyl acyclic sulfone wherein the acyclic radical consists of four carbon atoms and is substituted by at least three halogens, and wherein the phenyl radical is represented by the formula

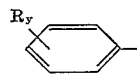

wherein R is selected from the class consisting of alkyl and halogen, and y is selected from the group consisting of O and integers from 1 to 5.

6. A process for the production of phenyl acyclic sulfones wherein the acyclic radical consists of four carbon atoms and is substituted by at least three halogens, and wherein the phenyl radical is represented by the formula:

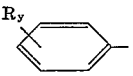

wherein R is selected from the class consisting of alkyl and halogen, and y is selected from the group consisting of O and integers from 1 to 5 which comprises reacting the corresponding phenyl sulfenyl halide with an unsaturated compound containing at least two halogens selected from the class consisting of polyhalobutenes and polyhalobutynes, and oxidizing the resulting phenyl acyclic sulfide to the corresponding sulfone by contacting said sulfide with hydrogen peroxide at a temperature in the range from about 0° to about 200° C.

References Cited in the file of this patent

UNITED STATES PATENTS

| | | |
|---|---|---|
| 2,484,489 | Craig et al. | Oct. 11, 1949 |
| 2,573,580 | Ladd | Oct. 30, 1951 |

FOREIGN PATENTS

| | | |
|---|---|---|
| 778,759 | Great Britain | July 10, 1957 |

UNITED STATES PATENT OFFICE
CERTIFICATE OF CORRECTION

Patent No. 3,039,919            June 19, 1962

Joseph E. Moore

It is hereby certified that error appears in the above numbered patent requiring correction and that the said Letters Patent should read as corrected below.

Column 1, line 11, for "acrylic" read -- acyclic --; columns 7 and 8, Table I, column 1, line 1 thereof, for "-1,2,4-" read -- -1,3,4- --; same Table I, column 1, line 7 thereof, for "2-chloro-4-" read -- 2-chloro-4-(4- --.

Signed and sealed this 23rd day of October 1962.

(SEAL)
Attest:

ERNEST W. SWIDER
Attesting Officer

DAVID L. LADD
Commissioner of Patents